United States Patent [19]

Goldsworthy

[11] 3,960,629

[45] June 1, 1976

[54] METHOD FOR INDUCTIVE HEAT CURING OF CONDUCTIVE FIBER STOCK

[76] Inventor: William Brandt Goldsworthy, 2504 Novato Place, Palos Verdes Estates, Calif. 90274

[22] Filed: Jan. 31, 1975

[21] Appl. No.: 545,924

[52] U.S. Cl.............................. 156/180; 156/244; 156/272; 156/296
[51] Int. Cl.²...................... B32B 31/26; H05B 5/00
[58] Field of Search .......... 156/380, 441, 180, 181, 156/244, 272, 273, 296; 219/10.61

[56] References Cited
UNITED STATES PATENTS

| | | | |
|---|---|---|---|
| 2,374,515 | 4/1945 | Walton et al. | 156/380 |
| 2,871,911 | 2/1959 | Goldsworthy et al. | 156/441 |
| 3,556,888 | 1/1971 | Goldsworthy | 156/380 |
| 3,562,470 | 2/1971 | Bobart et al. | 219/10.61 |
| 3,574,031 | 4/1971 | Heller, Jr. et al. | 156/272 |
| 3,674,601 | 7/1972 | Goldsworthy | 156/380 |

Primary Examiner—William A. Powell
Assistant Examiner—M. G. Wityshyn

[57] ABSTRACT

A composite strand of thermosetting synthetic plastic resin reinforced with fibers of conductive or semi-conductive material is produced by a pultrusion machine and process which forms and impregnates the composite strand and pulls it through the stage of impregnation, followed by curing, and forming. At the impregnation stage liquid thermosetting resin is mixed with hardener and the fiber strand saturated with the mixture and rough formed. During the initial curing stage a cure is started by heating the fibers by use of inductive electrical wave energy and the heated fibers in turn heat the resin. Before final curing, the saturated strand is pulled through the finish die where it may be externally heated and wherein the saturated strand is given its final cross-sectional shape and external finish, and cured to completion immediately prior to final emergence at the exit end of the finish die.

7 Claims, 8 Drawing Figures

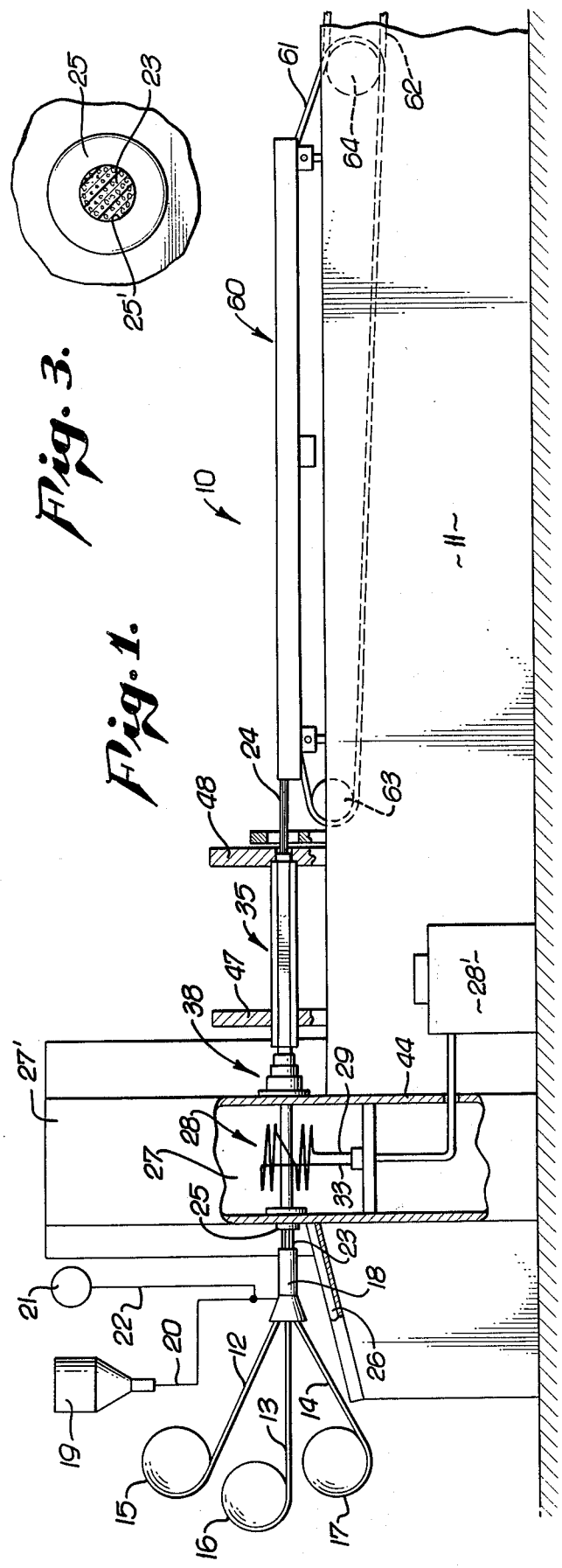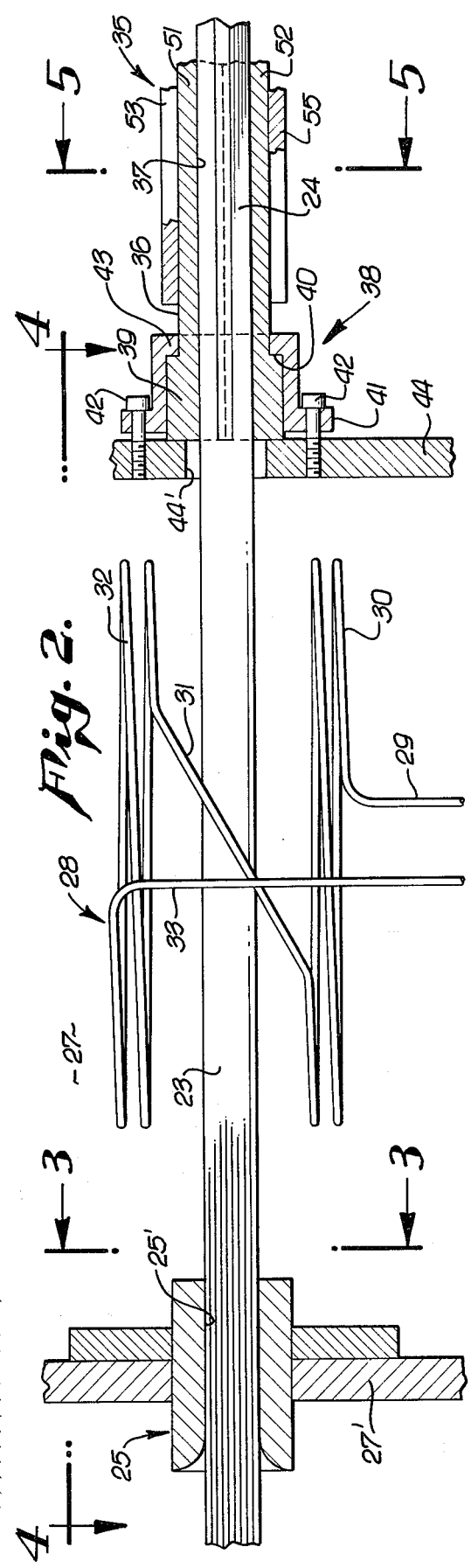

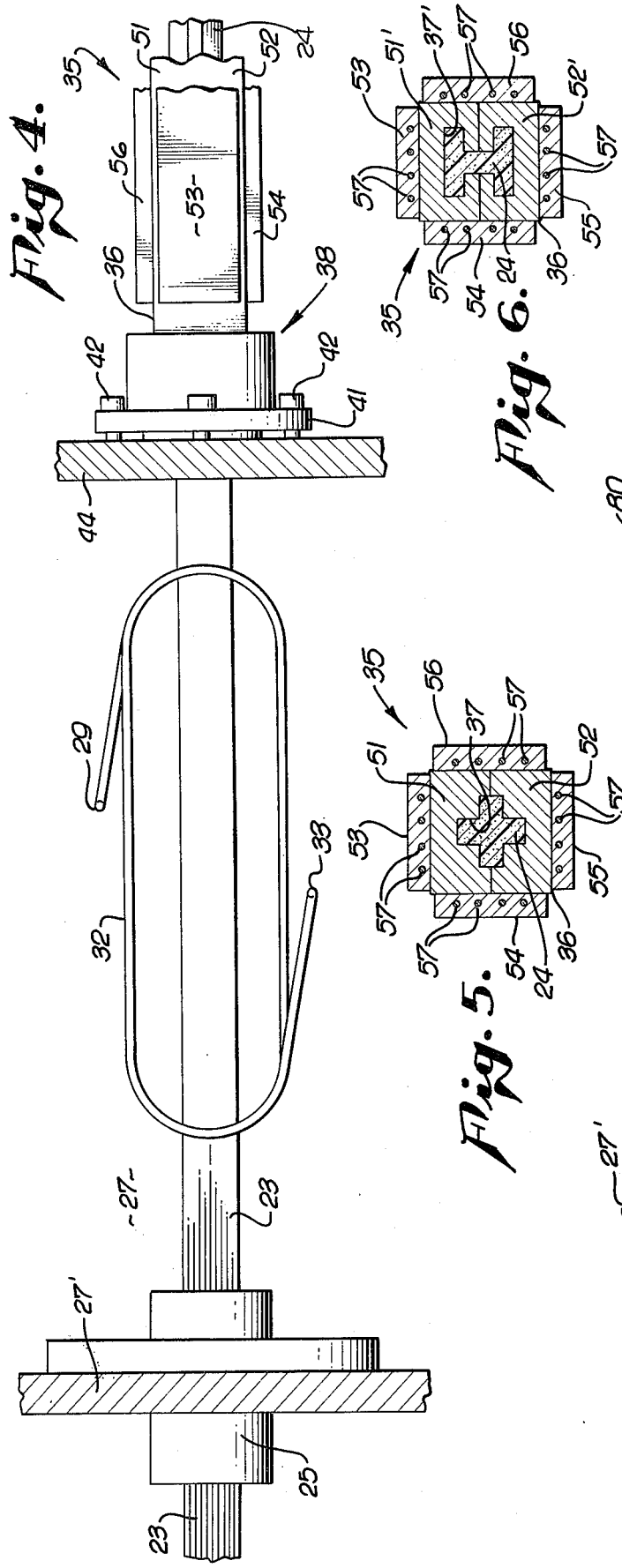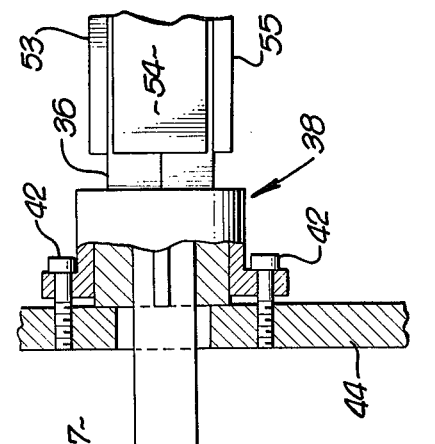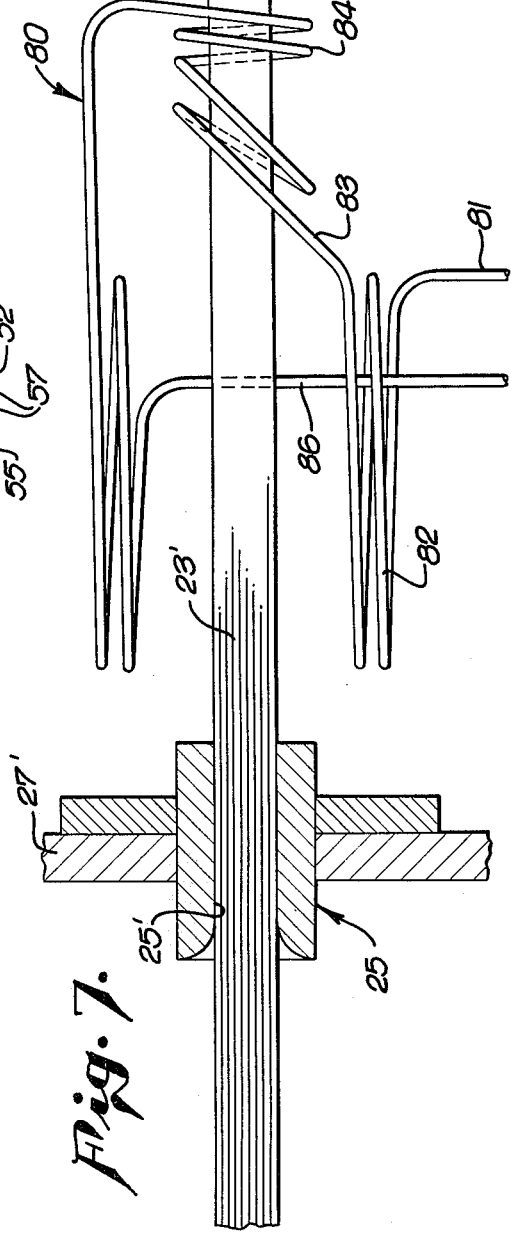

RELATIONSHIP BETWEEN ORIENTATION ANGLE AND TEMPERATURE RISE FOR GRAPHITE EPOXY COMPOSITE EXPOSURE TIMES OF 30 AND 60 SECONDS

GRAPHITE HM
RESIN S 206 II
$P_L = 0.75$ tw
FREQ = 7m Hz

METHOD FOR INDUCTIVE HEAT CURING OF CONDUCTIVE FIBER STOCK

Prior art treating with the subject of manufacturing resin impregnated fiberglass strands can be found in U.S. Pat. Nos. 2,871,911, 3,556,888.

The patents referred to above undertake to make use of heating by electric wave energy for curing the catalyzed thermosetting resin which impregnates the fiberglass roving. These procedures have been improved in a distinct fashion by the later filed patents which specifically disclose the employment of radio frequencies in the range of 45 to 500 megahertz or in the alternative microwave energy within the band of 950 to 5,200 megahertz. By using such electrical wave energy starters for curing the catalyzed resin, the cure can be started simultaneously throughout the entire cross-section of the as yet uncured catalyzed stock and thus appreciably speed up and improve the curing process in a continuous flow machine.

Use of electrical energy in the wave bands made reference to has been primarily directed to the curing of stock wherein both the resin and the fibers are of non-conductive materials. The nature of electric wave energy is such that non-conductive materials respond immediately. When the reinforcing fibers are metallic strands, or one or another of the newer synthetic semi-conductive materials such as boron or carbon fibers, employment of electric wave energy in the manner heretofore practiced is no longer expedient and in fact not at all feasible as a heat inducing agency to initiate the cure.

Although it is readily possible to heat up a composite stock of thermosetting resin and fibers of conductive material by use of RF or microwave energy there is a disadvantage in the overheating of the conductive fibers when the resin is at a curing temperature and consequently a proper bond is not created. Fiber temperatures may become so hot that the immediately adjacent resin becomes damaged or charred, and there appears to be no available way to control the wave energy to balance the heating effect between the two substances having such different electrical conductive properties.

Heated die tubes have been employed on occasions for the curing of conventional fiber reinforced catalyzed thermosetting resin of the usual composition. Such die tubes have of necessity been heated on the exterior and start the cure on the exterior of the catalyzed resin which, as a consequence, requires additional steps to be certain that the catalyzed stock is cured completely through the cross-sectional area prior to completion. Such exteriorly heated die tubes are capable only of very slow speed operation and the limit thus imposed on the process has been a substantial handicap. Even though steel or comparable metal die tubes do have the capability of sustaining their dimensional shape and size, the difficulties encountered in the prior art have placed a limit not only on speed of operation but also on the cross-sectional limitations of the cured stock.

When both the die and the stock is of conductive material, a condition is created which requires a substantially different curing technique, especially if the final product is to be held to a close tolerance for all cross-sectional shapes, and a speed of output assured which will maintain the competitive position of the product in the market place.

It is therefore among the objects of the invention to provide a new and improved composite strand of resin and conductive type fibers and a method and apparatus for producing such a strand wherein the finished stock is of dependable cured composition and can be virtually of any profile and any distribution of mass throughout the profile.

Another object of the invention is to provide a new and improved method and machine for continuously producing a plastic stock composed of conductive or semi-conductive fibers impregnated with a thermosetting resin wherein dimensional stability can be maintained in the stock irrespective of the complexity of the cross-sectional shape.

Still another object of the invention is to provide a new and improved induction heat curing expedient for thermosetting plastic stock reinforced with conductive fibers where orientation of the fibers may vary throughout the cross-sectional area of the stock.

Still another object of the invention is to provide a new and improved method and apparatus for continuously producing plastic stock composed of conductive or semi-conductive fibers impregnated with a thermosetting resin wherein the cure as well as the exterior finish is under dependable control at all times.

Still another object of the invention is to provide a new and improved method and apparatus for producing plastic stock composed of conductive or semi-conductive fibers impregnated with a thermosetting resin wherein the process and apparatus can be quickly and effectively converted to one operating on nonconductive fiber impregnated stock whereby to minimize the amount of equipment in an operation and require a minimum amount of down-time when the change over is to be made.

Also included among the objects of the invention is to provide a new and improved method and apparatus for the continuous production of plastic stock composed of conductive or semiconductive fibers impregnated with a thermosetting resin which employs the advantages of progressive first and second stage cures whereby to speed up the running rate of the stock above those speeds heretofore possible and in a manner productive of accurately dimensioned finished sections of virtually all commercial configurations and with a durable surface texture.

With these and other objects in view, the invention consists of the construction, arrangement, and combination of the various parts of the device and the method, whereby the objects comtemplated are attained, as hereinafter set forth, pointed out in the appended claims and illustrated in the accompanying drawings.

In the drawings:

FIG. 1 is a side elevational view of a machine capable of employing the method with portions of the process shown schematically.

FIG. 2 is a longitudinal sectional view of the first curing stage portion of the device.

FIG. 3 is a cross-sectional view on the line 3—3 of FIG. 2.

FIG. 4 is a longitudinal view on the line 4—4 of FIG. 2.

FIG. 5 is a cross-sectional view on the line 5—5 of FIG. 2.

FIG. 6 is a cross-sectional view similar to FIG. 5 but showing a different cross-sectional shape.

FIG. 7 is a longitudinal sectional view similar to the view of FIG. 2 but showing a second form of the invention.

Figure 8:
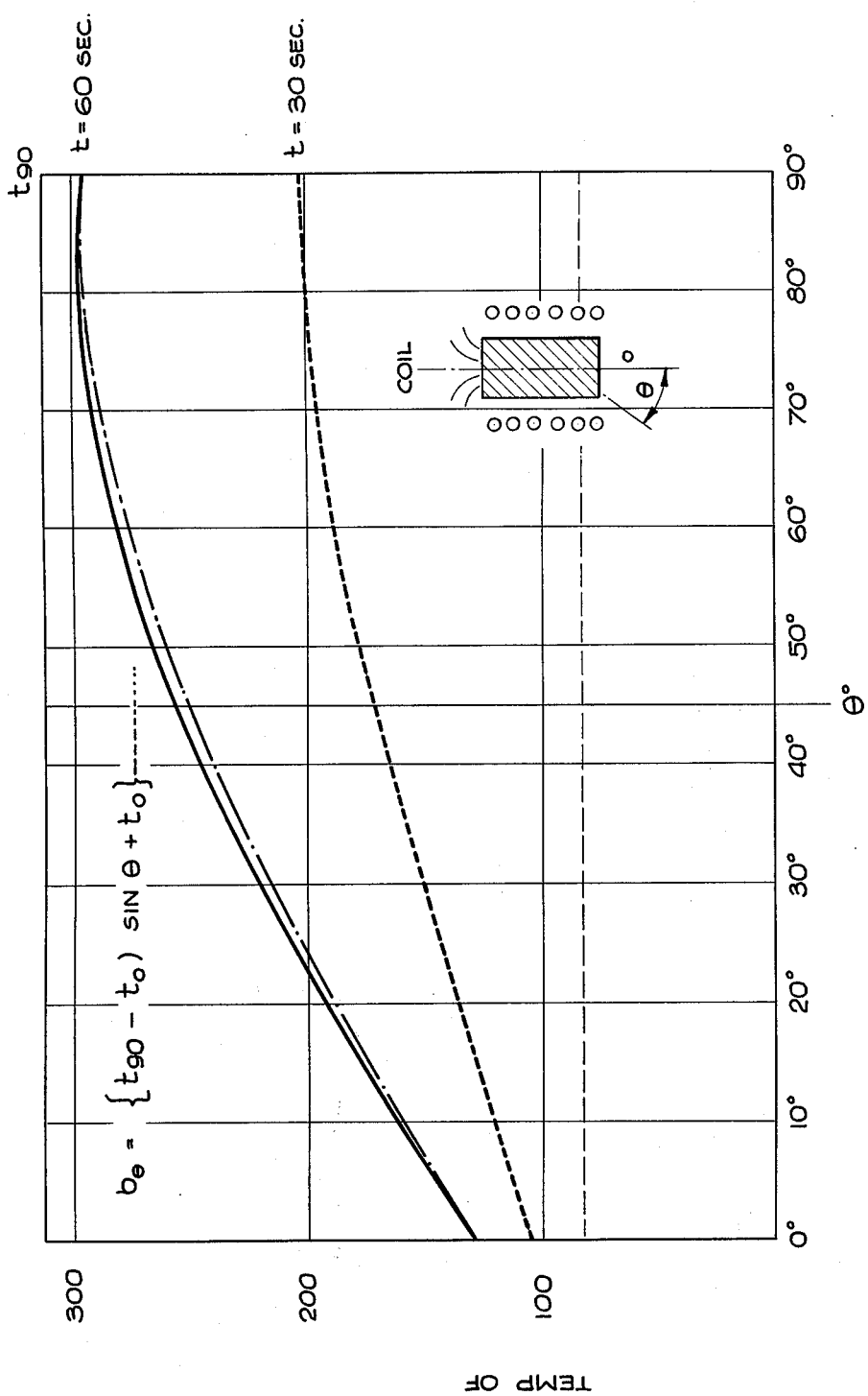
FIG. 8 is a graph showing the relationship between fiber orientation angle and temperature.

To understand the adaptation of induction heating priciples to the heating of a composite fiber impregnated resin material some reference should be made to the character of heating of this kind frequently termed eddy current heating. The term covers in general generation of heat in any conducting material by means of magnetically induced currents. Frequencies in present day use range from 60 cycles to 5 million cycles although the major applications use frequencies of from 1,000 cycles to 2 million cycles. Inasmuch as the depth of the zone in which heat is generated is a function of frequencies, several different frequencies, together with means for generating them, are in general use. Initially motor generator sets were depended upon for generating frequencies between about 60 cycles and 15,000 cycles. Such expedients have progressively given way to electronic oscillators and especially for frequencies above 15,000 cycles. When an alternating current flows in a conductor an alternating magnetic field is set up in the surrounding area and when a conducting material is placed in that area a current flow is set up in the material. This current is such that the counter magnetic field generated by it would tend to cancel the existing field.

Since the external magnetic flux must penetrate the surface before reaching the interior of such conducting material, the greater part of the current flow will be near the surface, and the heating effect drops off rapidly the greater the distance inwardly from the surface. Normally best results are achieved when the material to be heated lies within the coil but heating can be accomplished when the material is exterior to but in close proximity to the coil. As a consequence the shape of the coil has appreciable significance, when the shape of the article to be heated is taken into consideration.

The science of induction heating recognizes that rigorous equations for eddy current losses are relatively complex to the point where they are not readily usable. Approximate formulas are therefore helpful to show the relationship for an understanding of the problems involved. The amount of power dissipated as heat in the part to be heated and as has been pointed out above in the surface of that part expressed in terms of magnetic flux density and frequency having regard for the electrical characteristics of the conductor which is being heated is $$\Delta P = \frac{Ht^2 \sqrt{puf}}{8\pi}$$

The depth of penetration, indicated by the character δ, of the heat for any given frequency and material is $$\delta = \frac{1}{2\pi} \sqrt{\frac{P}{uf}}$$

The depth indicated is that at which the eddy circuits fall to a value of about 37% of their magnitude at the surface. From the foregoing there is an indication of the power induced in the conductive work material which is dissapated in the form of heat, in terms of the magnetic flux intensity, the resistivity, and magnetic permeability of the work material, and the frequency of the induced current.

For a given conductive material and magnetic flux intensity the foregoing equations can be reduced to still simpler forms for purposes of the disclosure herein.

$$\text{Heat generated } \alpha \ \sqrt{\text{Frequency}}$$

$$\text{Depth of penetration } \alpha \ \frac{1}{\sqrt{\text{Frequency}}}$$

The foregoing is a simplier equation for indicating that the depth of penetration can be defined as the distance below the surface of the conductor at which the induced current falls to 37% of the current induced at the surface.

It will be seen from the above simplified equations that under given conditions there is a trade-off between the amount of heat generated and the way it is distributed through the depth of the material. In the particular case of the pultrusion process, it is desirable that the induced heat be generated as uniformly as possible. This would call for the lowest possible frequency of operation. However, to induce a given amount of heat at an arbitrarily low frequency means an arbitrarily high applied magnetic-field intensity. The latter requirement would tend to create engineering problems with the necessary generating equipment, hence the trade-off.

In the practical case, since the resistivity of conductive filamentary materials useful in the pultrusion process is relatively high, and since they are used in exceedingly small diameters and are on the average well-insulated electrically from each other by the surrounding resin matrix, it has been found that acceptably uniform heating through a wide range of product cross-sections can be obtained using available induction heating generating equipment operating in the low frequency (LF) to high frequency (HF) range of the spectrum. The invention herein disclosed reveals that useful results are obtained using induction heating apparatus operating in the range 180 to 500 kilohertz, and using special generators operating as high as seven megahertz. In particular, with a product cross-section of one inch, acceptable uniform heating is obtained in an uncritical manner with frequencies from 180 to 500 kilohertz, and cross-sections of the order of ⅛ inch are usefully heated at 7 megahertz.

From the above it will be seen that the matter of choice of frequency of the induced current is related to practical engineering considerations. The invention herein involves combining the pultrusion process with the use of induction heating to enhance the cure rate, expressly when the fibers in the composite material are electrically conductive.

Normally for the continuous production of stock consisting of fiber reinforced resin the fibers are in the form of roving extending length-wise along the long axis of the stock which is parallel to the path of travel of stock through the process. Since this is by no means the only orientation of fibers of this character it should be appreciated that the axes of the fibers may be oriented in various directions sometimes transverse to the axis of the path of travel, sometimes at an angle with respect thereto, and sometimes at random with axes in various different directions. Even on such occasions the orientation may be such that a greater percentage of the fibers will be oriented in one selected direction and the lesser percentage oriented in some other direction.

It is important therefore to consider the heating effect of conductive fibers in various orientations with respect to the axis of the induction heating coil. As indicated on FIG. 8 the heating effect induced in fibers is very little above ambient temperature when the fibers lie parallel to the axis of the induction heating coil and the heating increases progressively to a maximum when the axis of the fiber is at 90° with respect to the axis of the coil. There is however an appreciable and acceptable heating effect for fibers which are oriented at an angle of 45° and even lower.

When the method and process of the invention is followed for the curing of synthetic plastic resin stock in which fibers of semi-conductive material have been impregnated in the manner disclosed when the stock of the composition disclosed is subjected to proper induction heating as described the temperature rises substantially uniform throughout the entire cross-sectional area. In a one inch cross-section of a combination of graphite fiber and epoxy the temperature at the center of the cross-section has been found to be at least equal to or even on some occasions slightly higher than the surface temperature.

The values shown on the graph FIG. 8 were obtained by preparing cylindrical sections of stock consisting of graphite fibers and epoxy in proper proportion and thorough impregnation drawn to a section ⅜ inches in diameter. The stock was then subjected to heating in a coil provided with a variable current up to 30 amps and at a frequency of about 7 megahertz, under circumstances where the stock was wound in the form of a helix at different angles namely, 1°, 30°, 45°, 60°, and 90° with respect to the axis.

One embodiment of a method and apparatus by means of which the invention can be successfully performed makes use of a pultrusion machine indicated generally by the reference character 10 consisting of a bed 11 upon which the various portions of the apparatus are mounted.

Generally elongated rovings of fibers and possessing a smaller percentage of transversely oriented fibers are fed from respective rolls 15, 16, and 17 to a composing tube 18. A liquid thermosetting resin material is fed from a reservoir 19 through a feed line 20 to the composing tube 18. Simultaneously, liquid hardener from a reservoir 21 is fed through a feed line 22 either into the feed line 20, as shown, or directly into the composing tube 18 in a fashion such that a suitable amount of the hardener, namely a catalyst, is fed and mixed with the resin and the liquid mixture thus formed impregnates and saturates the rovings 12, 13, and 14 in the composing tubes. It should be noted that the resin and catalyst may be premixed. In this event the fibers are passed through a conventional impregnating tank (not shown) before entering the composing tube 18, which then acts only as a means for preliminary shaping and eliminating excess resin and air. As a consequence a saturated strand of rovings identifiable as a strand of stock 23 emerges from the composing tube and passes to a starter die 25 where any surplus liquid mixture can be squeezed from the saturated strand 23 and permitted to flow back through a return 26 to a suitable location where it can be either re-used or disposed of. An opening 25' in the starter or forming die 25 gives the strand 23 an initial form.

A first curing stage for the saturated strand 23 is at the location of a chamber 27 in a housing 27' which can be construed as the succeeding step in the process following a composing stage in the composing tube 18. In the chamber 27 is an induction coil indicated generally by the reference character 28. Current for the coil passes into the chamber through a lead 29 to a first coil section 30 and thence along a diagonal portion 31 to a second coil section 32 which is located in spaced relationship to the coil section 30. A lead 33 from the section 32 provides the other connection for the induction coil 28. A generating unit 28' of substantially conventional construction capable of generating necessary frequencies is electrically connected to the leads 29 and 33. The inductive field thus produced should be one productive of temperature in the fibers of not to exceed about 375°F.

Downstream with reference to the direction of movement of the saturated strand or stock 23 is a finish die, indicated generally by the reference character 35, portions of which are shown in FIG. 2 and longitudinal sectional details of which are shown in FIG. 7. The finish die is of composite construction consisting primarily of a die tube 36 which is of metal and which can be either steel, beryllium-copper, aluminum, or other good heat conducting metal.

Since a central passage 37 is to provide an uninterrupted flow path for the saturated strand at an important stage in the process, a die tube 36 of selected cross-sectional configuration is releasably connected at a joint 38. The die tube 36 is provided with a collar 39 brought into snug engagement with a shoulder 40 of a flange 43 to make the connection. A second flange 41 engages and is bolted by means of cap screws 42 to a wall 44, namely one of the walls surrounding the chamber 27.

The mounting described is by way of example only. An acceptable mounting may be provided by the plates 47 and 48 with the finish die 35 attached at its opposite ends. An opening 44' in the wall 44 is in axial alignment with the finish die 35.

As shown in FIG. 5, the finish die 35 is made up of two die halves 51 and 52 each of which provide half of the central passage 37, shown in the form of a cross in FIG. 5. Die halves 51' and 52' form an H-section 37' as in FIG. 6, or virtually any other cross section, either simple or complex, and possessed of relatively thin-walled sections, relatively thick-walled sections, or a combination of the two.

Surrounding the die halves are heating pads 53, 54, 55, and 56, which in the chosen embodiment employ electric resistance wires 57 for heating the pads and in consequence heating the die halves from the exterior. Other known and acceptable external heating means may also be used.

For moving the saturated strand 23 through the operation an appropriate pull mechanism 60 is employed. Details of a typical and suitable pull mechanism are disclosed in some particular in U.S. Pat. No. 3,556,888.

The saturated strand 23 which has now become a cured strand 24 at the location indicated in FIG. 1, is grasped by the pull mechanism 60 and, as provided for in the pull mechanism, is constantly pulled through the process at a selected continuous and steady rate, the pull mechanism being powered by suitable chains 61 and 62 passing over pulleys 63 and 64.

In the embodiment of the invention illustrated in FIG. 7, a special induction coil indicated by the reference character 80 is employed in the chamber 27 and wave energy from the coil passes directly to a saturated strand or stock 23'. In order to create the strand 23' there is provided a starter die, again indicated generally by the reference character 25, located in a wall of or upstream of the housing 27', the starter die being of appropriate configuration.

The induction coil 80 of FIG. 7 is of a form illustrative of one capable of raising the temperature of all fibers in the strand 23' of a composite character in which the fibers may be at random or in any event, in which fibers may have an orientation other than parallel to the axis of flow.

Taken as an example the induction coil 80 has a lead 81 which connects to a coil section 82 lying below and parallel to the path of travel of the strand 23'. The coil section may be circular or if preferred, may be elongated so as to conform to a substantial portion of the length of the strand within the chamber 27 and its diameter. The coil section 82 connects directly to a diagonally disposed coil section 83 which in turn connects to a coil section 84, the axis of which is concentric with respect to the axis of the strand 23'. Again the coil section 84 connects to a coil section 85 which is parallel to and concentric with respect to the coil section 82 but on the opposite side of the strand 23' forming a passageway therebetween for the strand. A lead 86 forms the other connection for the composite induction coil 80.

Shaped as shown and described the coil sections provide coils having axes respectively at 90°, 45°, and 0° with respect to the axis of the strand 23. Consequently, where some of the fibers are disposed at an axis of 45° and others at 90° with respect to the axis of the strand there will be coil sections capable of raising the temperature of such fibers to a maximum degree. In such a strand where it be assumed that most of the fibers lie parallel to the path of travel, coil sections of greatest effectiveness are preferably located at 90° with respect thereto. Should the relationship of the fiber alignment be otherwise, coil sections can be provided and disposed at the angle most suited to the disposition of the fiber axes.

By taking into consideration disposition of fiber axes at various orientations throughout the cross-sectional area of the strand 23' a maximum amount of heating effect can be produced instantaneously throughout the entire cross-section thereby to materially speed up the cure and as a consequence the passage of the strand of stock material through the process.

As has been previously noted, even though basically induction heating has its maximum effect on the surface of a metallic conductor, the fibers of conductive material, carbon, boron, steel or other as the case may be are very small in diameter and are insulated one with respect to the other by being properly embedded in the plastic material which is a dielectric. As a consequence each fiber whether it be one at the center of the cross-section or out near the surface, is heated to the same extent and even though the heating is at a maximum only at the surface the fiber diameter is so small that for all practical purposes the entire cross-section area of each individual fiber is immediately raised to the desired temperature and the temperatures combined to heat up the entire cross-section of the composition and it is this immediate heating effect which promptly initiates the cure in the resin material even though the induction effect of the coil does not create directly a heated condition in the dielectric substance.

Furthermore since the fibers of conductive material are the agency by means of which heat is generated in the mass the heating of these fibers can be carefully controlled by the electric impulse given to the coil. This can be varied at will with respect to frequency taking into consideration the size of the cross-sectional area of the strand and the electrically conductive character of the material of the fibers which compose it, namely, permeability and resistivity.

In a dual die combination such as that herein described, the die opening 25' forming a central passage need not have the precisely required finished size or even the finished shape inasmuch as the cure which is started by the wave energy in the chamber 27 is not carried to completion until the saturated stand 23 passes into the finish die 35. As shown, for example in the chosen embodiment FIG. 3, the form of the saturated strand 23 may be circular and may be changed to the configuration of a cross by the finish die 35. In other words, the rate of passage of the saturated stand may be so timed to the rate of curing initiated by the wave energy that the catalyzed resin in the saturated strand instead of being completely cured in the chamber 27 is only partially cured and in semi-soft state when passed into the finish die 35 can be reformed and also can be sized precisely to the size it will have when completely cured and hardened.

At the same time, due to the fact that the finish die is a steel die, a finished surface will be applied to the exterior of the cured stock in the finish stage of the operation. Further still, inasmuch as the cure is in fact started throughout the entire area of the saturated strand, due to the exothermic action, the center will be slightly hotter and hence the hardening will commence at the center and work toward the exterior. Under such circumstances, such gases as may be created by the reaction readily pass outwardly and leave the saturated strand, a condition which would not be present should the strand be cured by external heat which causes the formation of a skin on the exterior initially thereby to prevent the expulsion of gas.

Some circumstances may also exist where exothermic reactions initiated by induction heating in the forming die will continue as the saturated strand passes into the finish die generating enough heat so that external heating pads, like the pads 53, 54, 55, and 56 may be dispensed with while still enjoying the advantages of a steel or other metallic finish die.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention what is claimed as new in support of Letters Patent is as follows:

1. A method for the curing of stock consisting of a fiber strand of at least partially conductive material impregnated with thermosetting resin of nonconductive material by use of an inductive heating coil having loops extending around a longitudinal axis and productive of an inductive field, said method comprising initially continuously mixing a synthetic thermosetting liquid dielectric resin material with hardener material at a composing stage to form a catalyzed mixture, bringing together a mass of individual conductive fiber elements into a composite strand wherein the individual fibers are of a relatively small diameter such that when subjected to induction heating the heating effect is substantially uniform throughout the cross-sectional area of each fiber, saturating said strand with said mixture whereby to coat the exterior of the individual fibers with said resin material, orienting the longitudinal axes of said fibers in a selected direction, forming the saturated strand to a preselected cross-sectional shape and size, energizing said coil with an electric current, and passing the saturated strand through said inductive field with the axes of said fibers perpendicular to the axis of said coil, said current being one of a frequency of between about 60 Hertz and about 10 Megahertz the exact frequency chosen being dependent on work material size, shape and electrical properties and engineering considerations whereby to heat said fibers and pass heat from said fibers to said catalyzed mixture and initiate curing of said catalyzed mixture by heat generated in said fibers.

2. The method of claim 1 including passing said saturated strand to a final curing stage and there fixing the cross-sectional shape of the strand in its final cross-sectional shape, size and finish, and holding the saturated strand out of the influence of inductive heating energy during the final curing stage.

3. The method of claim 1 including maintaining the frequency of the electric current to a range of between 1000 and 2000 kilocycles.

4. The method of claim 3 including arranging said fibers in a random orientation and varying the relationship of loops of the coil relative to the axes of the fibers so all fibers for at least part of the passage through the inductive field have the fiber axis at an angle of substantially 90° relative to the axis of the coil.

5. The method of claim 4 including positioning loops of the coil so that axes of some loops are at right angles to each other and axes of other loops are oblique relative to axes of those loops which have axes at right angles relative to each other.

6. The method of claim 4 including placing the path of travel of the strand so that for at least part of the distance through the inductive field the axis of the strand varies between one of alignment with the axis of the coil to one at right angles to the axis of the coil.

7. The method of claim 4 including maintaining the strength of the inductive field to one productive of temperature in the fibers of not greater than about 375°F.

* * * * *